(12) United States Patent
Azem

(10) Patent No.: US 10,798,630 B1
(45) Date of Patent: Oct. 6, 2020

(54) MITIGATING CO-CHANNEL INTERFERENCE IN WIRELESS NETWORKS

(71) Applicant: Sprint Spectrum LP, Overland Park, KS (US)

(72) Inventor: Khaled Azem, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 51 days.

(21) Appl. No.: 16/239,054

(22) Filed: Jan. 3, 2019

(51) Int. Cl.
  *H04W 36/20* (2009.01)
  *H04W 36/24* (2009.01)
  *H04W 36/14* (2009.01)

(52) U.S. Cl.
  CPC ........... *H04W 36/20* (2013.01); *H04W 36/14* (2013.01); *H04W 36/24* (2013.01)

(58) Field of Classification Search
  CPC ...... H04W 36/20; H04W 36/14; H04W 36/24
  USPC .......................................................... 370/331
  See application file for complete search history.

(56) References Cited

U.S. PATENT DOCUMENTS

| 7,348,930 | B2 * | 3/2008 | Lastinger | H01Q 1/246 343/841 |
|---|---|---|---|---|
| 7,751,822 | B2 | 7/2010 | Hyslop et al. | |
| 8,032,142 | B2 | 10/2011 | Carter et al. | |
| 9,253,699 | B2 * | 2/2016 | Choi | H04W 36/20 |
| 9,763,103 | B2 | 9/2017 | Claussen et al. | |
| 2011/0244870 | A1 * | 10/2011 | Lee | H04W 4/06 455/444 |
| 2013/0088986 | A1 * | 4/2013 | Xiao | H04B 7/024 370/252 |
| 2013/0116011 | A1 * | 5/2013 | Lee | H01Q 1/246 455/562.1 |
| 2014/0274094 | A1 * | 9/2014 | Abdelmonem | H04W 72/0486 455/452.1 |
| 2015/0085753 | A1 * | 3/2015 | Chen | H04W 16/08 370/328 |
| 2015/0139188 | A1 * | 5/2015 | Tidestav | H04B 7/0486 370/331 |
| 2015/0163681 | A1 * | 6/2015 | Sadek | H04W 16/08 455/446 |
| 2015/0271764 | A1 * | 9/2015 | Agrawal | H04W 52/246 455/522 |
| 2015/0318945 | A1 * | 11/2015 | Abdelmonem | H04W 72/085 370/329 |
| 2015/0341939 | A1 * | 11/2015 | Sharma | H04W 52/243 370/329 |
| 2016/0080047 | A1 * | 3/2016 | Lastinger | H04B 7/0413 375/267 |
| 2016/0088575 | A1 * | 3/2016 | Xu | H04W 52/244 370/331 |
| 2017/0085428 | A1 * | 3/2017 | Barros | H04L 41/0886 |
| 2017/0201892 | A1 * | 7/2017 | Wen | H04B 7/063 |
| 2017/0272131 | A1 * | 9/2017 | Ananth | H04W 72/082 |

(Continued)

*Primary Examiner* — Peter G Solinsky

(57) ABSTRACT

Mitigating co-channel interference includes instructing a first access node to deploy a first radio air interface utilizing a first frequency band over a first default coverage area, instructing the first access node to deploy a second radio air interface utilizing a second frequency band over a first reduced coverage area, instructing a second access node to deploy a third radio air interface utilizing the first frequency band over a second reduced coverage area, and instructing the second access node to deploy a fourth radio air interface utilizing a second frequency band over a second default coverage area.

20 Claims, 8 Drawing Sheets

(56) References Cited

U.S. PATENT DOCUMENTS

| | | | |
|---|---|---|---|
| 2018/0070241 A1* | 3/2018 | Harel | A61B 5/0816 |
| 2018/0124792 A1* | 5/2018 | Khoshnevisan | H04B 17/345 |
| 2018/0294827 A1* | 10/2018 | Abdelmonem | H04W 16/32 |
| 2019/0020392 A1* | 1/2019 | Butler | H04B 7/0617 |
| 2019/0052294 A1* | 2/2019 | Abdelmonem | H04B 1/1036 |
| 2019/0124584 A1* | 4/2019 | Parikh | H04W 16/14 |
| 2020/0120518 A1* | 4/2020 | Geng | H04W 52/244 |

* cited by examiner

MITIGATING CO-CHANNEL INTERFERENCE IN WIRELESS NETWORKS

TECHNICAL BACKGROUND

As wireless networks evolve and grow, there are ongoing challenges in communicating data across such wireless networks. For example, a wireless network may include one or more access nodes, such as base stations, for providing wireless voice and data service to wireless devices in various coverage areas of the one or more access nodes. Further, access nodes may deploy radio air interfaces using one or more frequency bands or sub-bands, which enable wireless devices to connect (or "attach") to each access node. When two or more adjacent access nodes each deploy a wireless air interface using the same frequency band or sub-band, and when the coverage areas of these wireless air interfaces overlap, wireless devices within these overlapping coverage areas may experience interference, which may be referred to as "co-channel interference". For example, in the uplink direction, co-channel interference occurring at a serving access node may be caused by multiple wireless devices transmitting to one or more access nodes adjacent to the serving access node. Further, co-channel interference may occur due to two or more access nodes transmitting signals in the downlink direction, wherein wireless devices in an overlapping region of coverage areas of the two or more access nodes experience co-channel interference from their respective non-serving access nodes. Further, these problems are compounded when multiple access nodes each deploy wireless air interface resources that utilize multiple frequency bands, resulting in multiple co-channel overlapping areas within a wireless network.

OVERVIEW

Exemplary embodiments described herein include methods, systems, and processing nodes for mitigating co-channel interference within overlapping coverage areas of access nodes in a wireless network. An exemplary method for mitigating co-channel interference includes instructing a first access node to deploy a first radio air interface utilizing a first frequency band over a first default coverage area, instructing the first access node to deploy a second radio air interface utilizing a second frequency band over a first reduced coverage area, instructing a second access node to deploy a third radio air interface utilizing the first frequency band over a second reduced coverage area, and instructing the second access node to deploy a fourth radio air interface utilizing a second frequency band over a second default coverage area. The first default coverage area and the second default coverage area overlap.

An exemplary system for mitigating co-channel interference in a wireless network includes a first access node configured to deploy a first wireless air interface utilizing at least two frequency bands, a second access node configured to deploy a second wireless interface utilizing the at least two frequency bands, and a processing node configured to perform operations comprising determining, between the first access node and the second access node, one or both of a first interfering region associated with a first frequency band of the at least two frequency bands and a second interfering region associated with a second frequency band of the at least two frequency bands, instructing the first access node to reduce a coverage area of the first frequency band, and instructing the second access node to reduce a coverage area of the second frequency band.

An exemplary processing node for mitigating co-channel interference in a wireless network is configured to perform operations including instructing a first access node to deploy a first radio air interface utilizing a first frequency band over a first default coverage area and a second frequency band over a first reduced coverage area, and instructing a second access node to deploy a second radio air interface utilizing the first frequency band over a second reduced coverage area and a second frequency band over a second default coverage area. The first default coverage area and the second default coverage area overlap, the first reduced coverage area and the second default coverage area are adjacent each other, and the second reduced coverage area and the first default coverage area are adjacent each other.

DETAILED DESCRIPTION

Figure 1:
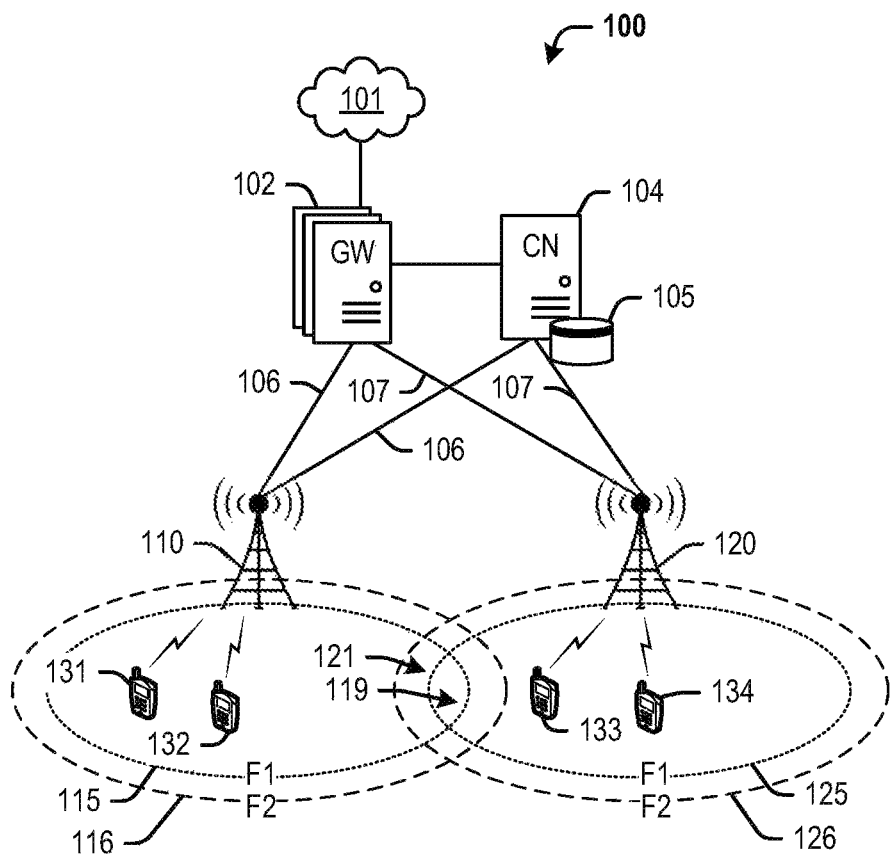
FIG. 1 depicts an exemplary system for mitigating co-channel interference in a wireless network.

In embodiments disclosed herein, methods for mitigating co-channel interference in a wireless network include instructing a first access node to deploy a first radio air interface utilizing a first frequency band over a first default coverage area, instructing the first access node to deploy a second radio air interface utilizing a second frequency band over a first reduced coverage area, instructing a second access node to deploy a third radio air interface utilizing the first frequency band over a second reduced coverage area, and instructing the second access node to deploy a fourth radio air interface utilizing a second frequency band over a second default coverage area. The first default coverage area and the second default coverage area overlap. Instructing either the first access node or the second access node to deploy the second radio air interface or the third radio air interface over the first reduced coverage area or the second reduced coverage area, respectively, is performed responsive to determining a co-channel interference (hereinafter, "interference") between one or more of the first, second, third, and fourth radio air interfaces. Further, a size of each of the first and second reduced coverage areas is based on an amount of interference determined between said one or more of the first, second, third, and fourth radio air interfaces. Interference may experienced in the downlink direction by a wireless device attached to one of the access nodes via said common frequency band in the overlap region, wherein transmissions to said wireless device may be subject to interference from the other access node. Further in the uplink direction, interference occurring at a serving access node may be caused by multiple wireless devices within an overlapping or interference region transmitting signals to one or more access nodes adjacent to the serving access node.

Thus, instructing the first access node to deploy the second radio air interface over the first reduced coverage area is performed responsive to determining an interference between the second radio air interface and the fourth radio air interface, or an interference between the first radio air interface and the third radio air interface. Prior to determining the interference, the first access node is configured to deploy the second radio air interface over a third default coverage area, the third default coverage area being larger than the first reduced coverage area. Further, instructing the second access node to deploy the third radio air interface over the second reduced coverage area is performed responsive to determining an interference between the first radio air interface and the third radio air interface, or between the second radio air interface and the fourth radio air interface. Prior to determining the interference, the second access node is configured to deploy the third radio air interface over a fourth default coverage area, the fourth default coverage area being larger than the second reduced coverage area. Reducing the first and second coverage areas minimizes an overlap region of same-frequency (i.e. co-channel) coverage areas and maintaining the first and second default coverage areas enables wireless devices to perform seamless handovers to different frequencies and/or access nodes when said wireless devices are traveling in a direction from one access node to the other access node. Further, an interfering region between two co-channel coverage areas may continue to exist, while a coverage area reduction of another frequency enables wireless devices to request handovers to said another frequency to avoid the interfering region.

Any of the first access node and the second access node are configured to deploy their respective radio air interfaces over the first or second reduced coverage area by reducing a power of said respective radio air interfaces. Alternatively or in addition, any of the first access node and the second access node are configured to deploy their respective radio air interfaces over the first or second reduced coverage area by adjusting an antenna tilt. Alternatively or in addition, any of the first access node and the second access node are configured to deploy their respective radio air interfaces over the first or second reduced coverage area by adjusting an antenna orientation. In other words, a same power may be maintained for each frequency, while a coverage area of said each frequency can be adjusted via an orientation, tilt, beamforming, azimuth, etc.

These operations may be performed in a static manner, or periodically over specific time intervals, such as a transmission time interval, or a specified number of subframes. Further, these operations may be incorporated within a system or processing node in a wireless network. For example, in another exemplary embodiment, systems for mitigating co-channel interference in a wireless network include at least a first access node configured to deploy a first wireless air interface utilizing at least two frequency bands, a second access node configured to deploy a second wireless interface utilizing the same at least two frequency bands, and a processing node configured to perform operations including determining, between the first access node and the second access node, one or both of a first interfering region associated with the first frequency band and a second interfering region associated with the second frequency band, instructing the first access node to reduce a coverage area of the first frequency band, and instructing the second access node to reduce a coverage area of the second frequency band. The operations may further include instructing the first access node to maintain a coverage area of the second frequency band at a first default coverage area, and instructing the second access node to maintain a coverage area of the first frequency band to a second default coverage area, wherein the first and second default coverage areas are respectively larger than the reduced coverage areas deployed by each access node. For the purposes of the present disclosure, a single frequency band may comprise two or more frequency sub-bands, or two or more frequency channels within the frequency band. Thus, the terms "first" and "second" frequency bands may further be interpreted as "first" and "second" frequency sub-bands and/or frequency channels.

Further, maintaining the coverage area of one frequency band and reducing the coverage area of another frequency enables wireless devices that are traveling in a direction from one access node to another to be seamlessly handed over to different frequencies and/or access nodes without interrupting a quality of service. For example, the operations further comprise identifying a wireless device attached to the first frequency band of first access node and traveling in a direction from the first access node to the second access node, triggering a first handover of the wireless device to the second frequency band of the first access node, and triggering a second handover of the wireless device to the first frequency band of the second access node. Alternatively or in addition, the operations further comprise identifying a wireless device attached to the second frequency band of the first access node and traveling in a direction from the first access node to the second access node, and triggering a handover of the wireless device to the first frequency band of the second access node. Alternatively or in addition, the operations further comprise identifying a wireless device attached to the second frequency band of the second access node and traveling in a direction from the second access node to the first access node, triggering a first handover of the wireless device to the first frequency band of the second access node, and triggering a second handover of the wireless device to the second frequency band of the first access node. Alternatively or in addition, the operations further comprise identifying a wireless device attached to the first frequency band of the second access node and traveling in a direction from the second access node to the first access node, and triggering a handover of the wireless device to the second frequency band of the first access node. Further, each of the first and second access nodes comprises a plurality of antennae, and wherein each access node is configured to reduce a coverage area of each frequency band, respectively, by one or more of: reducing a power to one or more antennae, adjusting a tilt of one or more antennae, or adjusting an azimuth of one or more antennae (for example, to direct formed beams to specific portions of a coverage area).

The processing node of the above-described system may be coupled to a first access node, a second access node, a controller node, or any other network node capable of performing the co-channel interference mitigation operations described herein. In another exemplary embodiment, a processor coupled to a processing node may be configured to perform operations including instructing a first access node to deploy a first radio air interface utilizing a first frequency band over a first default coverage area and a second frequency band over a first reduced coverage area, and instructing a second access node to deploy a second radio air interface utilizing the first frequency band over a second reduced coverage area and a second frequency band over a second default coverage area. The first default coverage area and the second default coverage area overlap, the first reduced coverage area and the second default coverage area are adjacent each other, and the second reduced coverage area and the first default coverage area are adjacent each other. The operations further comprise identifying a wireless device attached to the first frequency band of first access node and traveling in a direction from the first access node to the second access node, triggering a first handover of the wireless device to the second frequency band of the first access node, and triggering a second handover of the wireless device to the first frequency band of the second access node. Alternatively or in addition, the operations further comprise identifying a wireless device attached to the second frequency band of the first access node and traveling in a direction from the first access node to the second access node, and triggering a handover of the wireless device to the first frequency band of the second access node. Alternatively or in addition, the operations further comprise identifying a wireless device attached to the second frequency band of the second access node and traveling in a direction from the second access node to the first access node, triggering a first handover of the wireless device to the first frequency band of the second access node, and triggering a second handover of the wireless device to the second frequency band of the first access node. Alternatively or in addition, the operations further comprise identifying a wireless device attached to the first frequency band of the second access node and traveling in a direction from the second access node to the first access node, and triggering a handover of the wireless device to the second frequency band of the first access node.

These and additional embodiments are further described with reference to FIGS. 1-8 below.

FIG. 1 depicts an exemplary system 100 for mitigating co-channel interference. System 100 comprises a communication network 101, gateway 102, controller node 104, access node 110, access node 120, and wireless devices 131, 132, 133, 134. Access nodes 110, 120 can be any network node configured to provide communication between wireless devices 131, 132, 133, 134 and communication network 101, including standard access nodes and/or short range, low power, small access nodes. For instance, access nodes 110, 120 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In other embodiments, access nodes 110, 120 can be a small access node including a microcell access node, a picocell access node, a femtocell access node, or the like such as a home NodeB or a home eNodeB device. In either case, each access node 110, 120 can deploy one or more radio air interfaces that utilize one or more frequencies, enabling wireless communication with wireless devices 131, 132, 133, 134. For example, access nodes 110, 120 are each configured to deploy radio air interfaces utilizing a first frequency F1 and a second frequency F2. In this exemplary embodiment, access node 110 deploys a radio air interface utilizing frequency F1 over a coverage area 115 and a radio air interface utilizing frequency F2 over a coverage area 116, and access node 120 deploys a radio air interface utilizing frequency F1 over a coverage area 125 and a radio air interface utilizing frequency F2 over a coverage area 126. As shown herein, wireless devices 131, 132 attach to access node 110 via frequency bands F1 or F2. Similarly, wireless devices 133, 134 attach to access node 120 via frequency bands F1 or F2. Although access nodes 110, 120 and wireless devices 131, 132, 133, 134 are illustrated in FIG. 1, any number of access nodes and wireless devices can be implemented within system 100.

Further, as described herein, potentially interfering regions may be defined as regions where coverage areas of each access node 110, 120 and each frequency band F1 and F2 overlap. For example, coverage areas 115 and 125, each of which shares a frequency band F1 (i.e. co-channel coverage areas) overlap over a geographical region 119. Consequently, if a wireless device attached to one of access nodes 110, 120 via frequency band F1 enters region 119, transmissions to said wireless device may be subject to interference from the other of access node 110, 120. Similarly, coverage areas 116 and 126, each of which shares a frequency band F2 (i.e. co-channel coverage areas) overlap over a geographical region 121. Consequently, if a wireless device attached to one of access nodes 110, 120 via frequency band F2 enters region 121, transmissions to said wireless device may be subject to interference from the other of access nodes 110, 120. Alternatively or in addition, uplink transmissions from a wireless device attached to access node 110 may cause interference that is experienced at access node 120, and uplink transmissions from a wireless device attached to access node 120 may cause interference that is experienced at access node 110. To mitigate this interference, a processing node within system 100 (for example, a processing node communicatively coupled to access nodes 110, 120, and/or controller node 104) may be configured to instruct a first access node such as, for instance, access node 110, to deploy its radio air interface utilizing frequency band F1 over a default coverage area and to deploy its radio air interface utilizing frequency band F2 over a reduced coverage area. Further, the processing node may be configured to instruct a second access node (i.e. access node 120) to deploy its radio air interface utilizing frequency band F1 over a reduced coverage area, and to deploy its radio air interface utilizing frequency band F2 over a second default coverage area. See the embodiments illustrated in FIGS. 5-8 for configurations including default and reduced coverage areas.

Instructing either or both of access nodes 110, 120 to deploy co-channel (i.e. same-frequency) radio air interfaces over reduced coverage areas may be performed responsive to determining a presence of interfering regions 119, 121. For example, interference levels experienced by wireless devices in interfering regions 119, 121 may be monitored, and a presence of interference or a threshold level of interference may trigger the coverage area reductions. Further, a size of each reduced coverage area may be based on an amount of interference determined within overlap regions 119, 121. Reducing co-channel coverage areas as further described herein minimizes overlap regions 119, 121 while enabling wireless devices to perform seamless handovers to different frequencies and/or access nodes when said wireless devices are traveling in a direction from one access node to the other access node. Further, any of access nodes 110, 120 can be configured to deploy their respective radio air interfaces over the first or second reduced coverage area by reducing a power of said respective radio air interfaces. Alternatively or in addition, any of access nodes 110, 120 are configured to deploy their respective radio air interfaces over the first or second reduced coverage area by adjusting an antenna tilt. Alternatively or in addition, any of access nodes 110, 120 are configured to deploy their respective radio air interfaces over the first or second reduced coverage area by adjusting an antenna orientation. Alternatively or in addition, any of access nodes 110, 120 are configured to deploy their respective radio air interfaces over the first or second reduced coverage area by utilizing beamforming techniques.

These operations may be performed in a static manner, or repeatedly for specific time intervals, such as a transmission time interval, or a specified number of subframes. Further, these operations may be incorporated within a processing node or any other network node within system 100. For example, in another exemplary embodiment, systems for mitigating co-channel interference (in, for example, coverage overlap regions 119 and/or 121) are configured to perform operations including determining interference in one or both of regions 119, 121, instructing a first access node (e.g. access node 110) to reduce a coverage area of the first frequency band F1, and instructing the second access node (e.g. access node 120) to reduce a coverage area of the second frequency band F2. The operations may further include instructing access node 110 to maintain a coverage area of the second frequency F2 band at a default coverage area, and instructing access node 120 to maintain a coverage area of frequency band F1 to a default coverage area. The default coverage areas are respectively larger than the reduced coverage areas deployed by each access node 110, 120.

Further, a processing node may be coupled to any of access nodes 110, 120, controller node 104, or any other network node capable of performing the co-channel interference mitigation operations described herein. In an exemplary embodiment, a processor coupled to a processing node may be configured to perform operations including instructing a first access node (e.g. access node 110) to deploy a first radio air interface utilizing a first frequency band F1 over a first reduced coverage area, and a second frequency band F2 over a first default coverage area, and instructing a second access node (e.g. access node 120) to deploy a second radio air interface utilizing the first frequency band F1 over a second default coverage area and a second frequency band F2 over a second reduced coverage area. The first default coverage area and the second default coverage area overlap, the first reduced coverage area and the second default coverage area are adjacent to each other, and the second reduced coverage area and the first default coverage area are adjacent to each other. The operations further comprise identifying a wireless device attached to the first frequency band F1 of access node 110 and traveling in a direction from access node 110 to access node 120, triggering a first handover of the wireless device to frequency band F2 of access node 110, and triggering a second handover of the wireless device to frequency band F1 of access node 120. This and other handover scenarios are further described with reference to FIGS. 5-8.

Access nodes 110, 120 can comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131, 132, 133, 134 may be any device, system, combination of devices, or other such communication platform capable of communicating wirelessly with access nodes 110, 120 using one or more frequency bands of a radio-air interface deployed therefrom. Wireless devices 131, 132, 133, 134 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131, 132, 133, 134, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), 5G NR, or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to access nodes 110, 120 and wireless devices 131, 132, 133, 134, such as known distances and/or locations of access nodes 110, 120, geographical sizes of coverage areas 115, 116, 125, 126, locations of overlap regions 119, 121, locations of wireless devices 131, 132, 133, 134, interference levels experienced thereat, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, controller node 104, and/or network 101.

Figure 2:
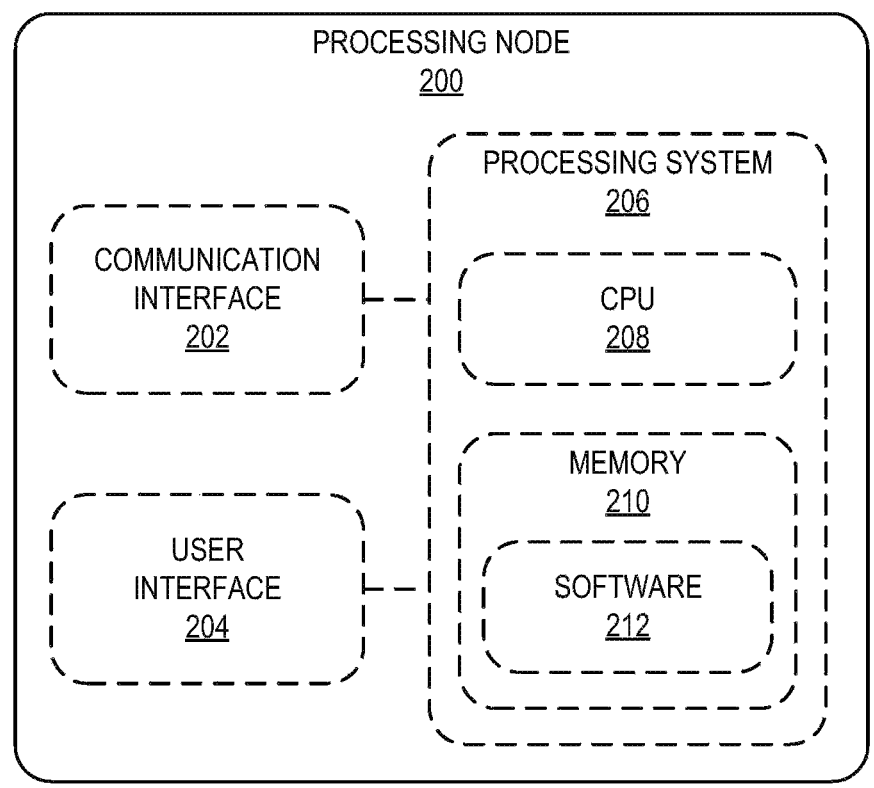
FIG. 2 depicts an exemplary processing node for mitigating co-channel interference in a wireless network.

FIG. 2 depicts an exemplary processing node 200 for mitigating co-channel interference in a wireless network. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store software 212 which is used in the operation of the processing node 200. Software 212 may include computer programs, firmware, or some other form of machine-readable instructions, including an operating system, utilities, drivers, network interfaces, applications, or some other type of software. For example, software 212 may include an interference mitigation module comprising instructions for performing the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
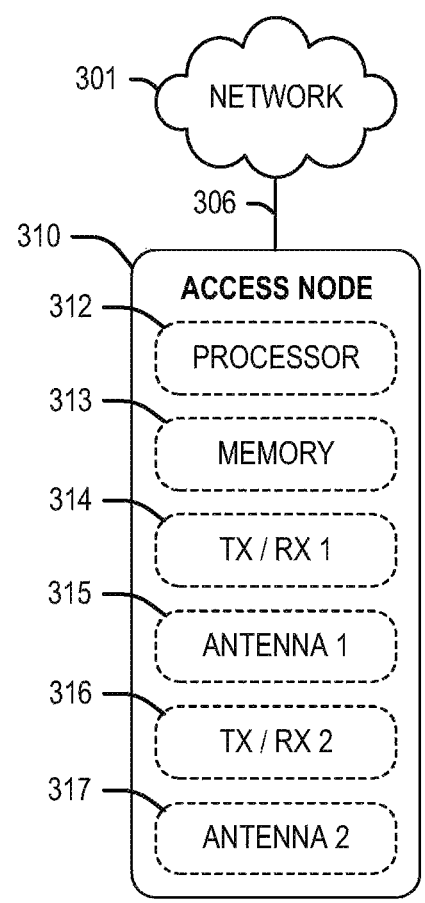
FIG. 3 depicts an exemplary access node.

FIG. 3 depicts an exemplary access node 310 for allocating resources in a control channel. Access node 310 is configured as an access point for providing network services from network 301 to end-user wireless devices via a radio-air interface deployed therefrom. Access node 310 is illustrated as comprising a processor 312, a memory 313 for storing one or modules including the operations recited herein (that are performed by processor 312), a first transceiver 314 and antenna 315 for deploying a radio air interface utilizing a first frequency band, and a second transceiver 316 and antenna 317 for deploying a radio air interface utilizing a second frequency band. Two pairs of transceivers and antennae are illustrated herein solely to simplify the written description, and it may be evident to those having ordinary skill in the art, that any combination of transceivers and antennae may be incorporated in order to deploy carriers of multiple frequencies, formed beams, MU-MIMO data streams, and/or to facilitate communication with other network nodes on network 301. Further, access node 310 is communicatively coupled to network 301 via communication interface 306, which may be any wired or wireless link as described above.

Figure 4:
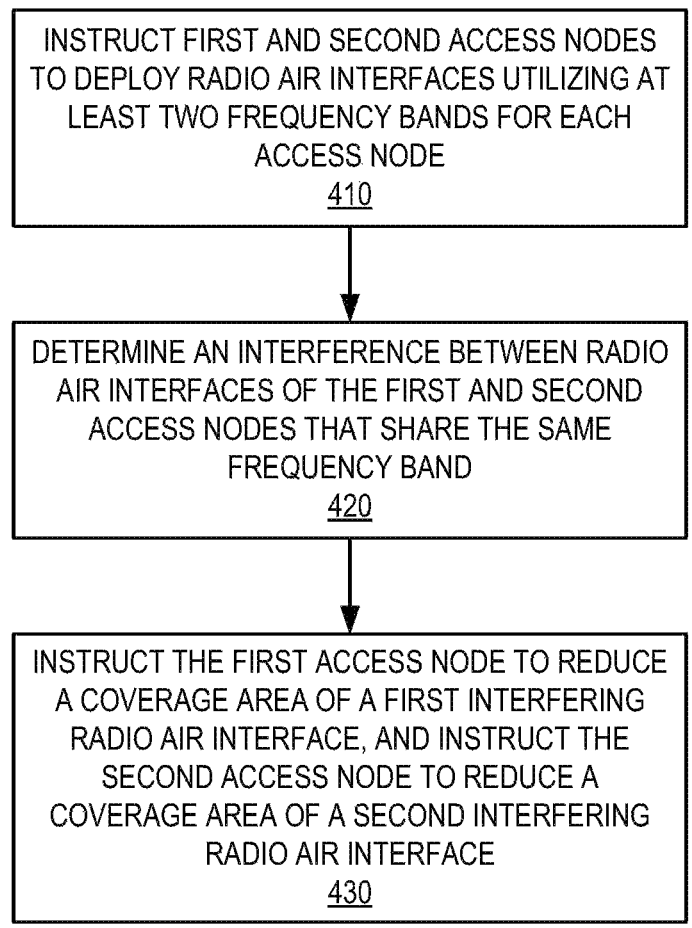
FIG. 4 depicts an exemplary method for mitigating co-channel interference in a wireless network.

FIG. 4 depicts an exemplary method for mitigating co-channel interference. The method of FIG. 4 is illustrated with respect to an access node, a controller node, or any other network node capable of performing the operations described herein. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, at least two neighboring access nodes in a wireless network are instructed to deploy radio air interfaces, with each access node utilizing at least two frequency bands. For example, a wireless network may comprise two or more access nodes that are configured to provide communication between wireless devices and other network nodes within or outside the wireless network. The access nodes can include standard access nodes and/or short range, low power, small access nodes, with standard access nodes including macrocell access nodes, base transceiver stations, radio base stations, next generation or gigabit NodeBs (gNBs) in 5G networks, or enhanced eNodeBs (eNBs) in 4G/LTE networks, and small access nodes including microcell access nodes, picocell access nodes, femtocell access nodes, or home NodeB or eNodeB devices. In either case, each access node can deploy one or more radio air interfaces that utilize one or more frequencies, enabling wireless communication with the wireless devices that are within a coverage area of each access node.

At 420, it may be determined that an interference becomes too high, or exceeds a threshold high interference. For example, as described herein, potentially interfering regions may be defined as regions where coverage areas of each access node that share a common frequency band overlap over a geographical region. Consequently, if a wireless device attached to one of the access nodes via said common frequency band enters the overlap region, transmissions to said wireless device may be subject to interference from the other access node. Further, co-channel interference occurring at a serving access node may be caused by multiple wireless devices within an overlapping or interference region transmitting signals to one or more access nodes adjacent to the serving access node. To mitigate this interference, at 430, a first access node may be instructed to deploy its radio air interface utilizing a first interfering frequency band over a reduced coverage area, and a second access node may be instructed to deploy its radio air interface utilizing a second interfering frequency band over a reduced coverage area. See the embodiments illustrated in FIGS. 5-8 for configurations including default and reduced coverage areas.

Instructing either or both of access nodes to deploy co-channel (i.e. same-frequency) radio air interfaces over reduced coverage areas may be performed responsive to determining a presence of interference within a potentially interfering region. For example, interference levels caused by downlink signals from one or both access nodes to wireless devices in the interfering regions may be monitored at 420, and a presence of interference or a threshold level of interference may trigger the coverage area reductions. Alternatively, interference levels experienced at one or both access nodes by uplink signals transmitted from wireless devices in the interfering regions may be monitored at 420. Further, a size of each reduced coverage area may be based on an amount of interference determined within the overlap regions. Reducing co-channel coverage areas as further described herein minimizes overlap regions while enabling wireless devices to perform seamless handovers to different frequencies and/or access nodes when said wireless devices are traveling in a direction from one access node to the other access node. Further, any of the access nodes can be configured to deploy their respective radio air interfaces over the first or second reduced coverage area by reducing a power of said respective radio air interfaces, by adjusting an antenna tilt, and/or by adjusting an antenna orientation.

Figure 5A:
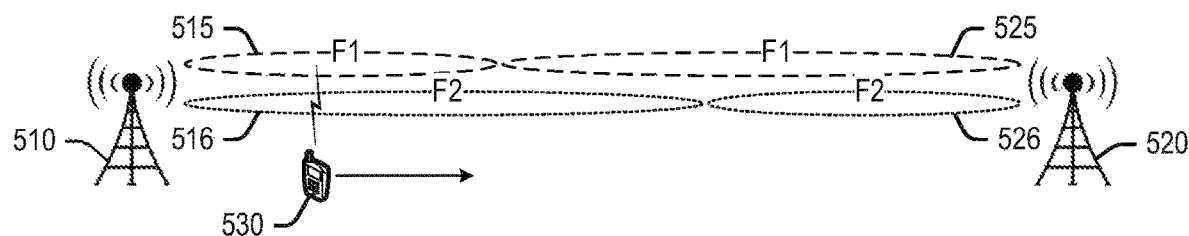
FIGS. 5A-5C depict a first exemplary handover scenario for a wireless device traveling in a direction from one access node to another, wherein both access nodes are configured to mitigate co-channel interference.
Figure 5B:
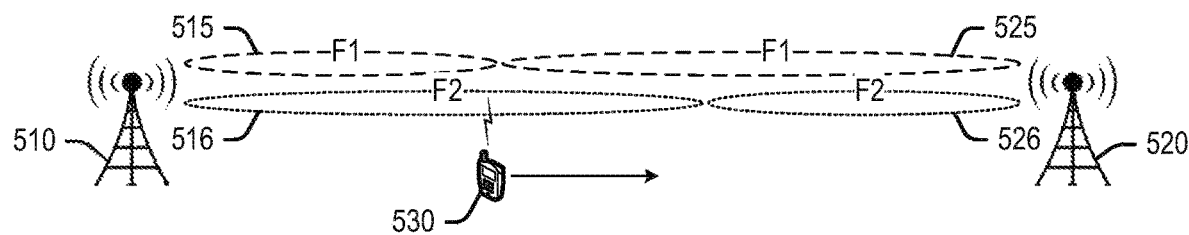
Figure 5C:
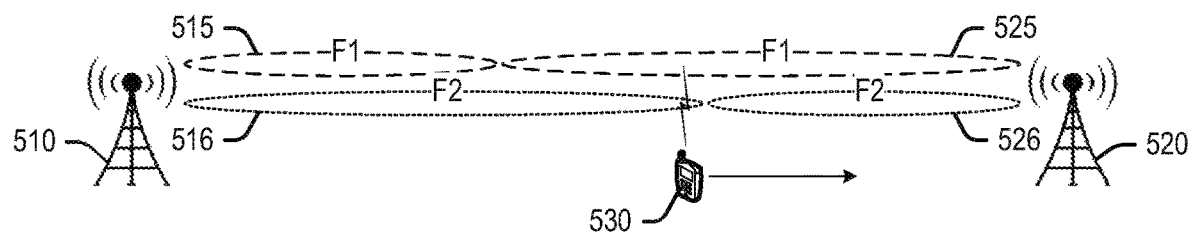

FIGS. 5A-5C depict a first exemplary handover scenario for a wireless device traveling in a direction from one access node to another, wherein both access nodes are configured to mitigate co-channel interference. For example, with respect to FIGS. 5A-5C, a first access node 510 is configured to deploy a wireless air interface utilizing frequency band F1 over a reduced coverage area 515 and frequency band F2 over a default coverage area 516, and a second access node 520 is configured to deploy a wireless air interface utilizing frequency band F1 over a default coverage area 525 and frequency band F2 over a reduced coverage area 526. Access nodes 510, 520 may have been instructed to deploy their respective radio air interfaces over the reduced coverage areas based on determining interference between overlapping regions associated with one or both frequency bands F1 and F2. As a consequence of reducing a coverage area of the frequency bands as illustrated herein, wireless device 530 traveling in a direction from one access node to another can be seamlessly handed over to different frequencies and/or access nodes without interrupting a quality of service, or generating uplink signals that interfere with access nodes 510, 520.

For example, with reference to FIG. 5A, wireless device 530 may be attached to frequency band F1 of access node 510 and traveling in a direction from access node 510 towards access node 520. With reference to FIG. 5B, since the wireless device 530 is approaching an edge of coverage area 515, a first handover is triggered of wireless device 530 to frequency band F2 of access node 510. The current location of wireless device 530 may therefore be identified as a first handover location. Further, reducing the coverage area 515 of frequency band F1 and performing a handover of wireless device 530 to frequency band F2 mitigates any potential interference caused in a previously-overlapping region between coverage areas 515 and 525, and provides a continued quality of service to a user of wireless device 530.

Further, with reference to FIG. 5C, since the wireless device 530 is approaching an edge of coverage area 516, a second handover is triggered of wireless device 530 to frequency band F1 of access node 520. The current location of wireless device 530 may therefore be identified as a second handover location. Further, reducing the coverage area 526 of frequency band F2 and performing a handover of wireless device 530 to frequency band F1 mitigates any potential interference caused in a previously-overlapping region between coverage areas 516 and 526, and provides a continued quality of service to a user of wireless device 530.

In a related exemplary embodiment, if an interfering region exists between two co-channel coverage areas 515 and 525 (i.e., if coverage area 515 is not a reduced coverage area but is a default coverage area), then a reduction of coverage area 526 enables wireless device 530 to be handed over to coverage area 516 of frequency F2 prior to entering said interfering region, and subsequently be handed over coverage area 525 or 526 upon moving past the interfering region.

Figure 6A:
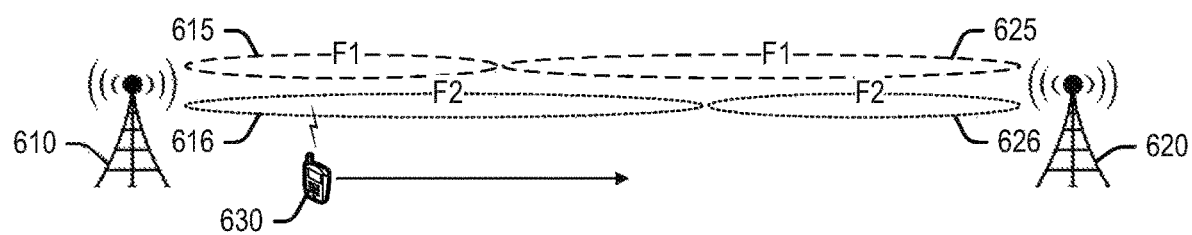
FIGS. 6A-6B depict a second exemplary handover scenario for a wireless device traveling in a direction from one access node to another, wherein both access nodes are configured to mitigate co-channel interference.
Figure 6B:
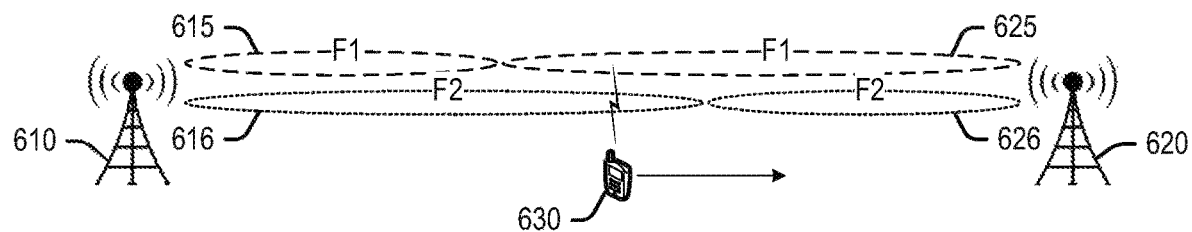

FIGS. 6A-6B depict a second exemplary handover scenario for a wireless device traveling in a direction from one access node to another, wherein both access nodes are configured to mitigate co-channel interference. For example, with respect to FIGS. 6A-6B, a first access node 610 is configured to deploy a wireless air interface utilizing frequency band F1 over a reduced coverage area 615 and frequency band F2 over a default coverage area 616, and a second access node 620 is configured to deploy a wireless air interface utilizing frequency band F1 over a default coverage area 625 and frequency band F2 over a reduced coverage area 626. Access nodes 610, 620 may have been instructed to deploy their respective radio air interfaces over the reduced coverage areas based on determining interference between overlapping regions associated with one or both frequency bands F1 and F2. As a consequence of reducing a coverage area of the frequency bands as illustrated herein, wireless device 630 traveling in a direction from one access node to another can be seamlessly handed over to different frequencies and/or access nodes without interrupting a quality of service.

For example, with reference to FIG. 6A, wireless device 630 may be attached to frequency band F2 of access node 610 and traveling in a direction from access node 610 towards access node 620. With reference to FIG. 6B, since the wireless device 630 is approaching an edge of coverage area 616, a handover is triggered of wireless device 630 to frequency band F1 of access node 620. The current location of wireless device 630 may therefore be identified as a handover location. Reducing the coverage area 615 of frequency band F1 and the coverage area 626 of frequency band F2 mitigates any potential interference caused in a previously-overlapping region between coverage areas 615 and 625 or 616 and 626. Further, performing a handover of wireless device 630 to frequency band F1 provides a continued quality of service to a user of wireless device 630.

In a related exemplary embodiment, if an interfering region exists between two co-channel coverage areas 615 and 625 (i.e., if coverage area 615 is not a reduced coverage area but is a default coverage area), then a reduction of coverage area 626 enables wireless device 630 attached to coverage area 616 (i.e. frequency F2) to avoid the interfering region and to be handed over to coverage area 625 or 626 upon moving past the interfering region.

Figure 7A:
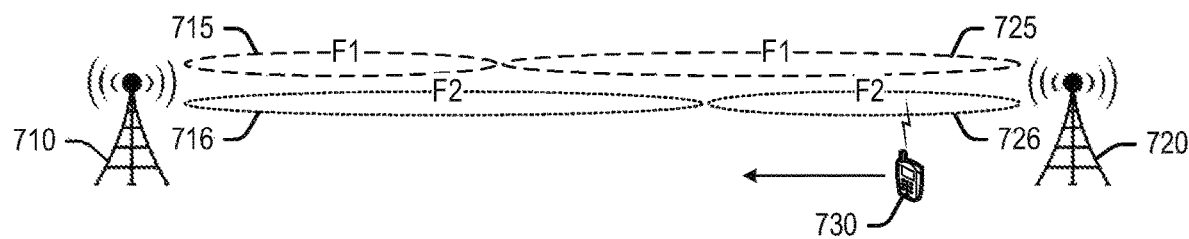
FIGS. 7A-7C depict a third exemplary handover scenario for a wireless device traveling in a direction from one access node to another, wherein both access nodes are configured to mitigate co-channel interference.
Figure 7B:
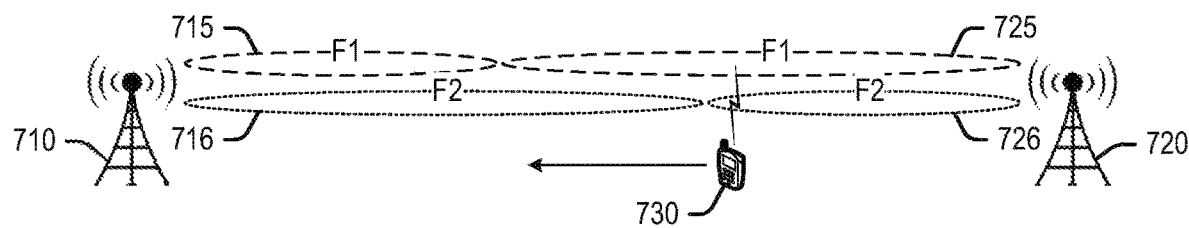
Figure 7C:
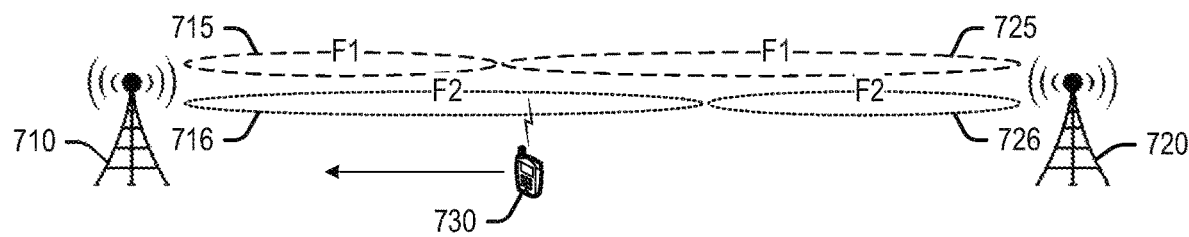

FIGS. 7A-7C depict a third exemplary handover scenario for a wireless device traveling in a direction from one access node to another, wherein both access nodes are configured to mitigate co-channel interference. For example, with respect to FIGS. 7A-7C, a first access node 710 is configured to deploy a wireless air interface utilizing frequency band F1 over a reduced coverage area 715 and frequency band F2 over a default coverage area 716, and a second access node 720 is configured to deploy a wireless air interface utilizing frequency band F1 over a default coverage area 725 and frequency band F2 over a reduced coverage area 726. Access nodes 710, 720 may have been instructed to deploy their respective radio air interfaces over the reduced coverage areas based on determining interference between overlapping regions associated with one or both frequency bands F1 and F2. As a consequence of reducing a coverage area of the frequency bands as illustrated herein, wireless device 730 traveling in a direction from one access node to another can be seamlessly handed over to different frequencies and/or access nodes without interrupting a quality of service.

For example, with reference to FIG. 7A, wireless device 730 may be attached to frequency band F2 of access node 720 and traveling in a direction from access node 720 towards access node 710. With reference to FIG. 7B, since the wireless device 730 is approaching an edge of coverage area 726, a first handover is triggered of wireless device 730 to frequency band F1 of access node 720. The current location of wireless device 730 may therefore be identified as a first handover location. Further, reducing the coverage area 726 of frequency band F2 and performing a handover of wireless device 730 to frequency band F1 mitigates any potential interference caused in a previously-overlapping region between coverage areas 726 and 716, and provides a continued quality of service to a user of wireless device 730.

Further, with reference to FIG. 7C, since the wireless device 730 is approaching an edge of coverage area 725, a second handover is triggered of wireless device 730 to frequency band F2 of access node 710. The current location of wireless device 730 may therefore be identified as a second handover location. Further, reducing the coverage area 715 of frequency band F1 and performing a handover of wireless device 730 to frequency band F2 mitigates any potential interference caused in a previously-overlapping region between coverage areas 725 and 715, and provides a continued quality of service to a user of wireless device 730.

In a related exemplary embodiment, if an interfering region exists between two co-channel coverage areas 715 and 725 (i.e., if coverage area 715 is not a reduced coverage area but is a default coverage area), then a reduction of coverage area 726 enables wireless device 730 to be handed over to coverage area 716 of frequency F2 prior to or upon entering said interfering region, and subsequently be handed over to coverage area 716 so as to move past the interfering region.

Figure 8A:
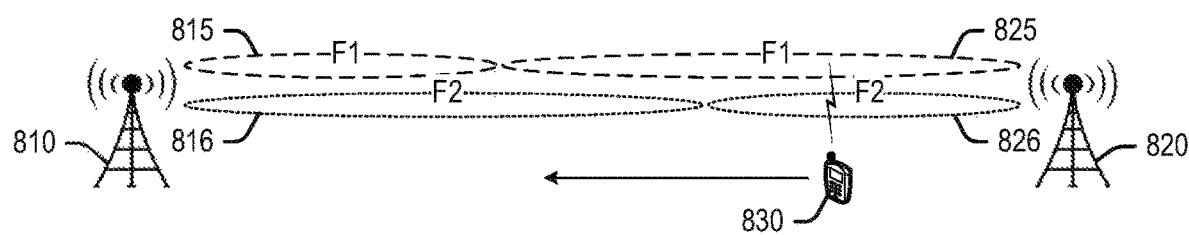
FIGS. 8A-8B depict a fourth exemplary handover scenario for a wireless device traveling in a direction from one access node to another, wherein both access nodes are configured to mitigate co-channel interference.
Figure 8B:
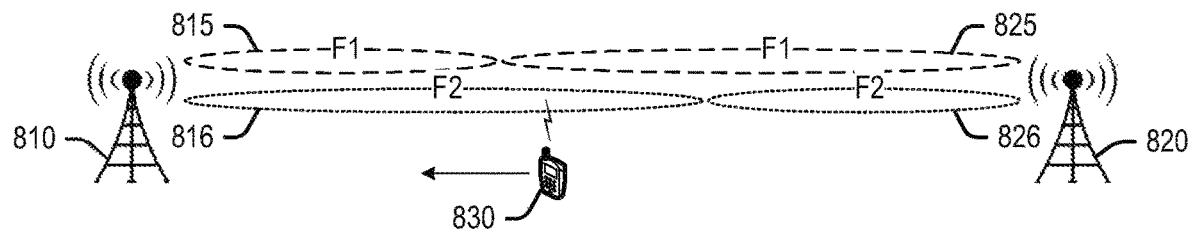

FIGS. 8A-8B depict a fourth exemplary handover scenario for a wireless device traveling in a direction from one access node to another, wherein both access nodes are configured to mitigate co-channel interference. For example, with respect to FIGS. 8A-8B, a first access node 810 is configured to deploy a wireless air interface utilizing frequency band F1 over a reduced coverage area 815 and frequency band F2 over a default coverage area 816, and a second access node 820 is configured to deploy a wireless air interface utilizing frequency band F1 over a default coverage area 825 and frequency band F2 over a reduced coverage area 826. Access nodes 810, 820 may have been instructed to deploy their respective radio air interfaces over the reduced coverage areas based on determining interference between overlapping regions associated with one or both frequency bands F1 and F2. As a consequence of reducing a coverage area of the frequency bands as illustrated herein, wireless device 830 traveling in a direction from one access node to another can be seamlessly handed over to different frequencies and/or access nodes without interrupting a quality of service.

For example, with reference to FIG. 8A, wireless device 830 may be attached to frequency band F1 of access node 820 and traveling in a direction from access node 820 towards access node 810. With reference to FIG. 8B, since the wireless device 830 is approaching an edge of coverage area 825, a handover is triggered of wireless device 830 to frequency band F2 of access node 810. The current location of wireless device 830 may therefore be identified as a handover location. Reducing the coverage area 815 of frequency band F1 and the coverage area 826 of frequency band F2 mitigates any potential interference caused in a previously-overlapping region between coverage areas 815 and 825 or 816 and 826. Further, performing a handover of wireless device 830 to frequency band F2 provides a continued quality of service to a user of wireless device 830.

In a related exemplary embodiment, if an interfering region exists between two co-channel coverage areas 815 and 825 (i.e., if coverage area 815 is not a reduced coverage area but is a default coverage area), then a reduction of coverage area 826 enables wireless device 830 attached to coverage area 825 (i.e. frequency F2) to avoid the interfering region and to be handed over to coverage area 816 upon entering the interfering region, and pass the interference region.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for mitigating co-channel interference between access nodes in a wireless network, the system comprising:
   a first access node configured to deploy a first wireless air interface utilizing at least two frequency bands;
   a second access node configured to deploy a second wireless interface utilizing the at least two frequency bands; and
   a processing node configured to perform operations comprising:
      determining, between the first access node and the second access node, one or both of a first interfering region associated with a first frequency band of the at least two frequency bands and a second interfering region associated with a second frequency band of the at least two frequency bands;
      instructing the first access node to reduce a coverage area of the first frequency band while maintaining a coverage area of the second frequency band; and
      instructing the second access node to reduce a coverage area of the second frequency band while maintaining a coverage area of the first frequency band.

2. The system of claim 1, wherein the operations further comprise:
   instructing the first access node to maintain a coverage area of the second frequency band at a first default coverage area; and
   instructing the second access node to maintain a coverage area of the first frequency band to a second default coverage area,
   wherein the first and second default coverage areas are respectively larger than the reduced coverage areas deployed by each access node.

3. The system of claim 1, wherein the operations further comprise:
   identifying a wireless device attached to the first frequency band of the first access node and traveling in a direction from the first access node to the second access node;
   triggering a first handover of the wireless device to the second frequency band of the first access node; and
   triggering a second handover of the wireless device to the first frequency band of the second access node.

4. The system of claim 1, wherein the operations further comprise:
   identifying a wireless device attached to the second frequency band of the first access node and traveling in a direction from the first access node to the second access node; and
   triggering a handover of the wireless device to the first frequency band of the second access node.

5. The system of claim 1, wherein the operations further comprise:
   identifying a wireless device attached to the second frequency band of the second access node and traveling in a direction from the second access node to the first access node;
   triggering a first handover of the wireless device to the first frequency band of the second access node; and
   triggering a second handover of the wireless device to the second frequency band of the first access node.

6. The system of claim 1, wherein the operations further comprise:
   identifying a wireless device attached to the first frequency band of the second access node and traveling in a direction from the second access node to the first access node; and
   triggering a handover of the wireless device to the second frequency band of the first access node.

7. The system of claim 1, wherein:
   each of the first and second access nodes comprises a plurality of antennae, and
   each access node is configured to reduce a coverage area of each frequency band, respectively, by one or more of: reducing a power to one or more antennae, adjusting a tilt of one or more antennae, or adjusting an azimuth of one or more antennae.

8. The system of claim 1, wherein the operations further comprise:
   instructing the first access node to maintain a coverage area of the second frequency band at a first default coverage area; and instructing the second access node to maintain a coverage area of the first frequency band to a second default coverage area,
wherein the first and second default coverage areas are respectively larger than the reduced coverage areas deployed by each access node.

9. The system of claim 1, wherein the operations further comprise:
identifying a wireless device attached to the first frequency band of the first access node and traveling in a direction from the first access node to the second access node;
triggering a first handover of the wireless device to the second frequency band of the first access node; and
triggering a second handover of the wireless device to the first frequency band of the second access node.

10. The system of claim 1, wherein the operations further comprise:
identifying a wireless device attached to the second frequency band of the first access node and traveling in a direction from the first access node to the second access node; and
triggering a handover of the wireless device to the first frequency band of the second access node.

11. The system of claim 1, wherein the operations further comprise:
identifying a wireless device attached to the second frequency band of the second access node and traveling in a direction from the second access node to the first access node;
triggering a first handover of the wireless device to the first frequency band of the second access node; and
triggering a second handover of the wireless device to the second frequency band of the first access node.

12. The system of claim 1, wherein the operations further comprise:
identifying a wireless device attached to the first frequency band of the second access node and traveling in a direction from the second access node to the first access node; and
triggering a handover of the wireless device to the second frequency band of the first access node.

13. A method for mitigating co-channel interference between access nodes in a wireless network, the method comprising:
determining, between a first access node configured to deploy a first wireless air interface utilizing at least two frequency bands and a second access node configured to deploy a second wireless interface utilizing the at least two frequency bands, one or both of a first interfering region associated with a first frequency band of the at least two frequency bands and a second interfering region associated with a second frequency band of the at least two frequency bands;
instructing the first access node to reduce a coverage area of the first frequency band while maintaining a coverage area of the second frequency band; and
instructing the second access node to reduce a coverage area of the second frequency band while maintaining a coverage area of the first frequency band.

14. The method of claim 13, further comprising:
instructing the first access node to maintain a coverage area of the second frequency band at a first default coverage area; and
instructing the second access node to maintain a coverage area of the first frequency band to a second default coverage area,
wherein the first and second default coverage areas are respectively larger than the reduced coverage areas deployed by each access node.

15. The method of claim 13, further comprising:
identifying a wireless device attached to the first frequency band of the first access node and traveling in a direction from the first access node to the second access node;
triggering a first handover of the wireless device to the second frequency band of the first access node; and
triggering a second handover of the wireless device to the first frequency band of the second access node.

16. The method of claim 13, further comprising:
identifying a wireless device attached to the second frequency band of the first access node and traveling in a direction from the first access node to the second access node; and
triggering a handover of the wireless device to the first frequency band of the second access node.

17. The method of claim 13, further comprising:
identifying a wireless device attached to the second frequency band of the second access node and traveling in a direction from the second access node to the first access node;
triggering a first handover of the wireless device to the first frequency band of the second access node; and
triggering a second handover of the wireless device to the second frequency band of the first access node.

18. The method of claim 13, further comprising:
identifying a wireless device attached to the first frequency band of the second access node and traveling in a direction from the second access node to the first access node; and
triggering a handover of the wireless device to the second frequency band of the first access node.

19. The method of claim 13, wherein:
each of the first and second access nodes comprises a plurality of antennae, and each access node is configured to reduce a coverage area of each frequency band, respectively, by one or more of: reducing a power to one or more antennae, adjusting a tilt of one or more antennae, or adjusting an azimuth of one or more antennae.

20. A processing node for mitigating co-channel interference between access nodes in a wireless network, the processing node being configured to perform operations comprising:
determining, between a first access node configured to deploy a first wireless air interface utilizing at least two frequency bands and a second access node configured to deploy a second wireless interface utilizing the at least two frequency bands, one or both of a first interfering region associated with a first frequency band of the at least two frequency bands and a second interfering region associated with a second frequency band of the at least two frequency bands;
instructing the first access node to reduce a coverage area of the first frequency band while maintaining a coverage area of the second frequency band; and
instructing the second access node to reduce a coverage area of the second frequency band while maintaining a coverage area of the first frequency band.

* * * * *